March 31, 1970 R. GASPARI 3,503,949
PROCESS FOR POLYMERIZING GASEOUS ETHYLENE UTILIZING A CONSTANT
DIAMETER REACTOR WITH VARYING SURFACE
AREA/VOLUME RATIO Filed July 7, 1966 2 Sheets-Sheet 1

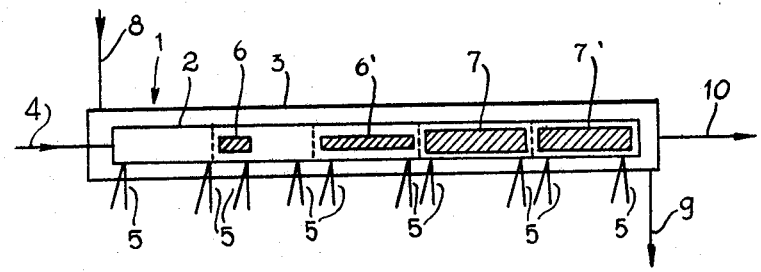

United States Patent Office 3,503,949
Patented Mar. 31, 1970

3,503,949
PROCESS FOR POLYMERIZING GASEOUS ETHYL-
ENE UTILIZING A CONSTANT DIAMETER RE-
ACTOR WITH VARYING SURFACE AREA/VOL-
UME RATIO
Raffaele Gaspari, Milan, Italy, assignor to Società Italiana
Resine S.p.A., Milan, Italy
Filed July 7, 1966, Ser. No. 563,480
Claims priority, application Italy, July 9, 1965,
15,509/65
Int. Cl. C08f 1/06, 1/60, 3/04
U.S. Cl. 260—94.9                                   6 Claims

ABSTRACT OF THE DISCLOSURE

Process for the continuous free radical high-pressure polymerization of gaseous ethylene comprising passing ethylene and a polymerization catalyst at super atmospheric pressure through a heated tubular reactor of uniform cross-sectional area, the reactor containing an elongated filling material adapted to provide a large reflective ratio of the inner surface area to the volume of the reactor in the discharge portion of the reactor.

---

Figure 1:
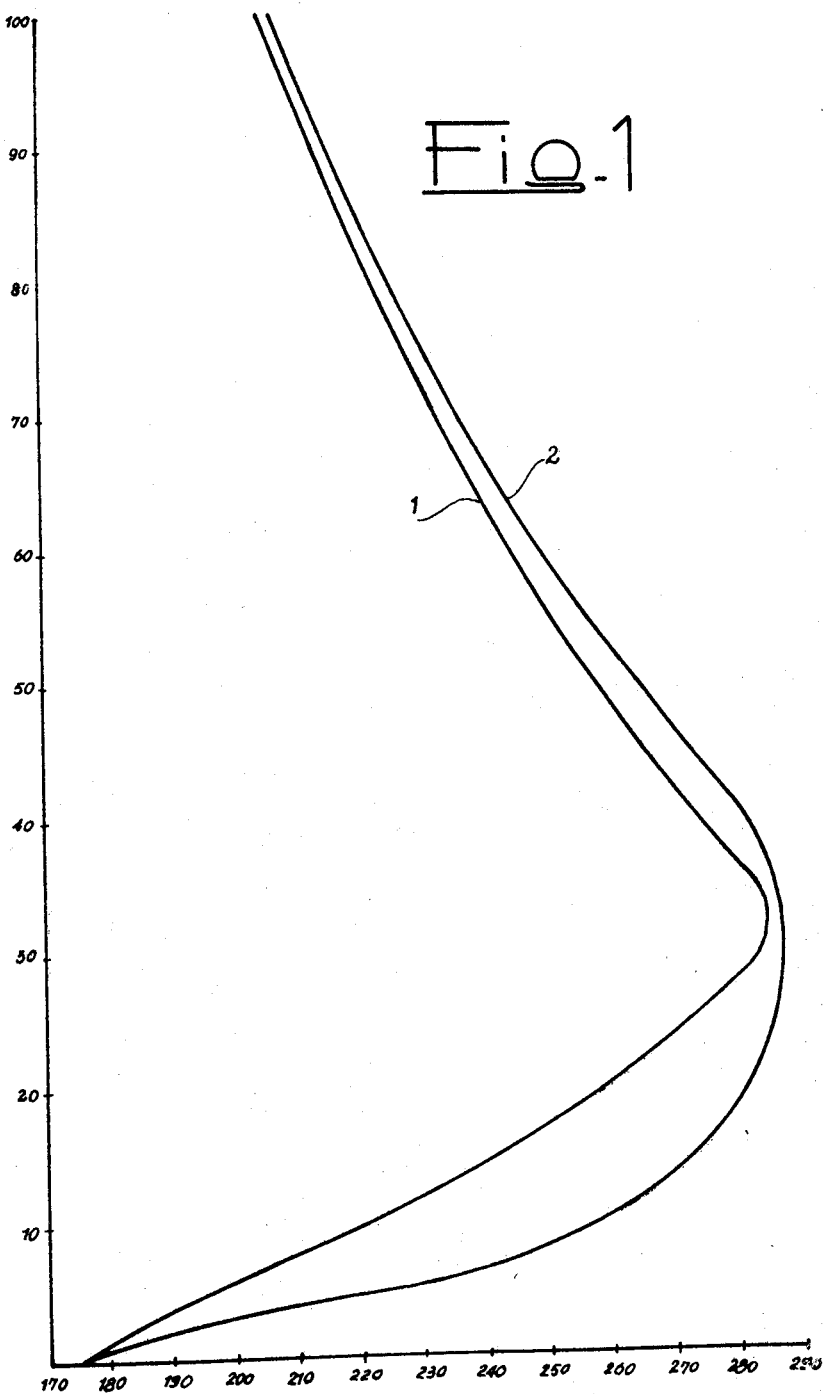

The present invention relates to a process for the continuous polymerisation of gaseous ethylene and to polyethylene produced by that process.

In the free radical polymerisation of gaseous ethylene at super-atmospheric pressures (from 500 kg./sq. cm. to 4000 kg./sq. cm.) the problem of dispersing the heat of reaction which is about 800 Kcal./kg. polymer is of great importance. In industrial practice two distinct types of methods for such polymerisations are in use, which methods use different means in an attempt to solve the problem of dispersing heat. These prior methods are a polymerisation process carried out in an autoclave with stirring and the mass polymerisation in a tubular reactor.

In the first of these processes cold ethylene is contacted with a reaction mass maintained at the desired reaction temperature (mostly between 150° C. and 300° C.). In this manner the heat of reaction is utilised for heating the new supply of cold ethylene. Obviously the conversion of ethylene to polymer depends upon the temperature difference of the supply of cold ethylene and the desired reaction heat. At preferred temperatures it is possible to convert 1% of the ethylene supplied for a 12 to 13° C. temperature difference between the supplied cold ethylene and the reaction mass. This means that with this process it is only possible to effect maximum conversions amounting to 5% to 15%.

The other type of prior process has a fundamentally different principle in that the heat of reaction is dispersed by effecting a vigorous heat exchange between the reaction mass (ethylene at the polymerising stage) and an external fluid. In order to ensure a satisfactory heat exchange surface this type of process employs reactors in the form of jacketed tubes of a high surface/volume or diameter/length ratio. These tubular reactors have, in general, diameter/length ratios varying between 1:250 up to 1:10,000. The ethylene should be heated to the reaction starting temperature, normally exceeding 150° C., possibly by preheating it before introducing it into the reaction zone. The heat of reaction is dispersed in part by allowing the temperature of the reaction mass to rise up to a predetermined maximum value (temperature peak) and by dispersing it through a fluid circulating in the tube jacket which is cooled with respect to the reaction mass. The circulating fluid should, in any case, be at a temperature exceeding the temperature at which polyethylene dissolves in unreacted ethylene in order to prevent the latter from precipitating on the wall and giving rise to various disturbances, particularly smearing of the wall which decreases the heat exchange power and excessive branching of the polymer and reactor obstruction. Usually the initial portion of the reactor acts as a preheater for a fresh supply of ethylene so it is convenient to keep the temperature of the circulating fluid maintained at values ranging between 150 and 200° C. The admissable temperature peak is about 300 to 350° C.

The free radical polymerisation of ethylene has a high reaction speed which is strictly dependent upon the temperature and upon the concentration of polymerisation initiators which may be present. When using the above-described tubular reactor process exceedingly high temperatures arise in the first portion of the reactor i.e. between the starting temperature and the temperature peak. These are followed by lower decreasing temperatures in the second portion of the reactor i.e. between the temperature peak and the outlet temperature. No initiators will be present in the second portion of the reaction and the heat exchange with the circulating fluid is particularly effective at this stage of the reaction due to the higher temperature difference. This type of process has advantages over the autoclave process in that it is possible to obtain speeds which are five or six times higher than those obtainable with the autoclave process and it is also possible to obtain conversions of the supplied ethylene of up to 30%.

It has now been found that an improved process for the polymerisation of ethylene is possible if gaseous ethylene is polymerised in a reactor of a special type having a high surface/volume ratio, the reactor having a variable cross sectional area and consequently different surface/volume ratios in individual zones.

Thus according to the present invention we provide a process for the continuous polymerisation of gaseous ethylene comprising passing gaseous ethylene at super-atmospheric pressure through a heated tubular reactor having a plurality of zones, the ratio of the inner surface area to the volume varying from zone to zone.

Preferably the surface/volume ratio of the various zones is varied by using a tubular reactor of uniform diameter and thickness and varying the cross sectional area by introducing into selected zones varying amounts of filling material. The filling material may be tubes concentric with the reactor, at least the tube of smallest diameter being closed at one end. Alternatively the filling material may be metal bars which may be axially aligned with the reactor. The tubes or bars may be held in position by any suitable guide means.

This type of reactor has advantages over conventional tubular reactors in that it enhances the speed of the reaction and hence also the heat exchange coefficients at the zone where dispersion of heat is particularly necessary. It is, moreover, advantageous in that a circulating fluid can be employed in the outer jacket which is at a higher temperature than in a conventional tubular reactor thus enabling the reaction to be carried out at different relative reaction temperatures over the length of the reactor to those of the prior process. This is a particularly important point in that it is known that it is the relative temperatures over the length of the reactor which determines the characteristics of the product, for example, its molecular weight.

The invention will now be further illustrated with reference to the accompanying drawings in which:

FIGURE I is a graph of the progress of one process according to the invention over the length of the reactor showing the reaction temperature in °C. as the abscissae and the reactor length as ordinates, and FIGURE II is a diagrammatic sketch of apparatus including one tubular reactor suitable for the process of the present invention.

In the graph of FIGURE I, curve 1 illustrates the progress of a method of polymerising ethylene in a tubular reactor according to a prior process and curve 2 illustrates the progress of the reaction in a process of polymerising ethylene according to the present invention. It can be seen from these curves that in the process according to the invention the reaction temperature rises more quickly and remains at its peak over a longer period. This results in polyethylene having improved characteristics.

The jacketed tubular reactor 1, shown in FIGURE II, comprises five interconnected sections 2 surrounded by a jacket 3. The supplied ethylene which may be premixed with oxygen enters the reactor by pipe 4 and the reaction temperature is measured by ten thermocouples 5, two being provided for each zone. The indications of the thermocouples 5 may be continuously recorded by means of an oscilloscope (not shown) so that the curve corresponding to curve 2 of FIGURE I can be obtained directly on a screen.

The surface/volume ratio may be varied by any desired means but the drawing shows round steel bars 6, 6' of similar diameter but the bar 6 being shorter than the bar 6', present in the second and third zones 2. The fourth and fifth zones also contain round steel bars 7, 7' but these are of larger size. The fluid circulating in the jacket 3 of the five tube sections forming the reactor may be water pressurised by a circulating pump (not shown) and entering the jacket at inlet 8 and leaving at outlet 9. The water may suitably be superheated to boil at 160° C.

The non-converted ethylene together with polymer leaves the reactor by pipe 10 and is discharged in pulses by means of a timed valve (not shown). This discharge takes place at intervals of 2 or 3 seconds approximately. The mixture may then be separated by any suitable means.

The following examples illustrate the invention further.

EXAMPLE I

This example illustrates a process of polymerising ethylene by a previously known process using a tubular reactor.

20 kg./h. of 99.5% ethylene was introduced into a tubular reactor which was 15 mm. in diameter and 7,500 m. overall length. The reactor comprised five jacketed interconnected sections each 1,400 m. long. The balance in the feed comprised saturated hydrocarbons having two or three carbon atoms. The feed also contained an initiator consisting of oxygen in an amount of 70 p.p.m. by volume.

The supplied ethylene premixed with oxygen was compressed to 1,500 kg./sq. cm. and preheated so that the temperature at the reactor inlet was about 175° C. Polymerisation started quickly; the progress of the temperature in the reactor being shown in FIGURE I, curve 1 of the accompanying drawing.

The fluid circulating in the jacket of the five tube sections forming the reactor comprising water pressurised by a circulating pump and maintained at 150° C.

The reactor temperature was measured by ten thermocouples, two being provided for each tube section, their indications being continuously (20 times a minute) recorded by means of an oscilloscope so that curve 1 appeared directly on the screen.

It was found that the maximum temperature reached 283° C.

The non-converted ethylene/polymer mixture was discharged by pulses from the reactor by means of a timed valve. The discharge takes place at intervals of 2 or 3 seconds approximately.

The issuing mixture was passed to a container maintained at a pressure of 400 kg./sq. cm. at a temperature of 150° C., in which a first separation of unreacted ethylene was performed. The mixture was then passed to a further container maintained at 5 kg./sq. cm. at 130° C. in which residual ethylene was separated. Both streams of unreacted ethylene were conveyed to a gas holder after lowering the pressure to the gas holder pressure and cooling in two heat exchangers which effect separation of any waxy polymers of low molecular weight and operate alternately to permit cleaning.

The melted polymer obtained is directly extruded and granulated by using a cutter immersed in water.

2.4 kg./h. polymer of the following characteristics was obtained:

viscosity in melated condition 15 (ASTM–D–1238), density 0.915 g./cc. (ASTM–D–792), ultimate tensile strength 80 kg./sq. cm. (ASTM–D–638).

EXAMPLE II

This example illustrates a process carried out according to the invention.

Round steel bars were positioned concentric with the tubes of the reactor used in Example I and were held by suitablue guides. They were positioned in the following manner:

1st section—no bar was introduced.
2nd section—a bar 4 mm. in diameter and 400 mm. long was introduced into the end portion in the direction of flow of the reactant.
3rd section—a bar 4 mm. in diameter and 1400 mm. in length was introduced.
4th section—a bar 8 mm. in diameter and 1400 mm. long was introduced.
5th section—a bar having the same dimensions as those of the 4th section was introduced.

The experiment described in Example I was repeated in the reactor containing the bars, with the only difference that the water circulating in the jacket was maintained at 160° C. The progress of the temperatures in the reactor, is shown in FIGURE I, curve 2 of the accompanying drawings. The maximum temperature reached 285° C.

3 kg./h. of granulated polymer of the following characteristics were obtained:

density 0.920 g./cc., viscosity in melted condition 8, ultimate tensile strength 120 kg./sq. cm.

By operating according to the invention it can be seen that there is a higher conversion of ethylene to polymer and a product of improved characteristic is obtained.

An attempt was made to carry out the experiment described in Example I with the circulating water at a temperature of 160° C. It did not prove satisfactory owing to difficulty in controlling the temperature peak, the temperature reaching very high peak values so that the products contained carbon.

What I claim is:

1. A process for the continuous free radical high-pressure polymerization of gaseous ethylene comprising passing ethylene and a polymerization initiator through a tubular reactor having a plurality of zones of uniform cross-sectional area, the second through last of said zones containing an elongated filling material adapted so as to provide an increasing effective ratio of the inner surface area of the tubular reactor to the volume of the tubular reactor as the ethylene passes along said reactor, said reactor being provided with external heat control means.

2. The process according to claim 1, wherein said polymerization is carried out under a pressure of greater than 500 kg./cm.², and at a temperature of greater than 150° C.

3. The process according to claim 1, wherein said filling material comprises concentric tubes within said reactor, at least the tube of the smallest diameter being closed at one end.

4. The process according to claim 3, wherein said reaction is carried out under a pressure of greater than 500 kg./cm.² and at a temperature of greater than 150° C.

5. The process according to claim 1, wherein said elongated filling material is axially aligned metal bars.

6. The process according to claim 5, wherein said polymerization is carried out under a pressure of greater than 500 kg./cm.², and at a temperature of greater than 150° C.

References Cited

UNITED STATES PATENTS 2,856,395  10/1958  Richards et al. _____ 260—94.9

JOSEPH L. SCHOFER, Primary Examiner

E. J. SMITH, Assistant Examiner

U.S. Cl. X.R.

23—289